United States Patent
Chiou et al.

(10) Patent No.: US 11,064,360 B2
(45) Date of Patent: Jul. 13, 2021

(54) NETWORK DEVICE AND WPS CONNECTION METHOD THEREOF

(71) Applicant: ARCADYAN TECHNOLOGY CORPORATION, Hsinchu (TW)

(72) Inventors: Jyh-Tzong Chiou, Taipei (TW); Jun Zheng, Shanghai (CN); Chih-Fang Lee, Hsinchu (TW)

(73) Assignee: ARCADYAN TECHNOLOGY CORPORATION, Hsinchu (TW)

( * ) Notice: Subject to any disclaimer, the term of this patent is extended or adjusted under 35 U.S.C. 154(b) by 237 days.

(21) Appl. No.: 16/234,885

(22) Filed: Dec. 28, 2018

(65) Prior Publication Data

US 2019/0208413 A1 Jul. 4, 2019

(30) Foreign Application Priority Data

Dec. 29, 2017 (TW) ................................ 106146612

(51) Int. Cl.
| | |
|---|---|
| *H04W 12/50* | (2021.01) |
| *H04W 76/10* | (2018.01) |
| *H04W 12/06* | (2021.01) |
| *H04W 48/16* | (2009.01) |
| *H04W 84/18* | (2009.01) |

(Continued)

(52) U.S. Cl.
CPC ........... *H04W 12/50* (2021.01); *H04W 12/06* (2013.01); *H04W 48/16* (2013.01); *H04W 76/10* (2018.02); *H04W 84/12* (2013.01); *H04W 84/18* (2013.01); *H04W 88/04* (2013.01)

(58) Field of Classification Search
None
See application file for complete search history.

(56) References Cited

U.S. PATENT DOCUMENTS

| | | | |
|---|---|---|---|
| 7,114,070 B1 * | 9/2006 | Willming | H04L 29/12273 380/30 |
| 2011/0264904 A1 * | 10/2011 | Hua | H04W 28/18 713/150 |
| 2013/0107796 A1 | 5/2013 | Du et al. | |

(Continued)

FOREIGN PATENT DOCUMENTS

| | | |
|---|---|---|
| CN | 103260254 A | 8/2013 |
| CN | 104486776 A | 4/2015 |

OTHER PUBLICATIONS

"Wi-Fi Simple Configuration Protocol and Usability Best Practicesw for the Wi-Fi Protected Setup Program," pp. 1-30, published by the WiFi Alliance, Apr. 2011.*

(Continued)

*Primary Examiner* — John F Mortell

(74) *Attorney, Agent, or Firm* — Locke Lord LLP; Tim Tingkang Xia, Esq.

(57) ABSTRACT

A network device, which can be disposed in a mesh network, and include a WPS button and a processing circuit. The WPS button may trigger a WPS connection process. The processing circuit may be connected to the WPS button. The processing circuit can determine whether the uplink connection of the network device exists; if the uplink connection of the network device does not exist, the processing circuit can implement an uplink connection process; if the uplink connection of the network device exists, the processing circuit can implement a downlink connection process.

6 Claims, 9 Drawing Sheets

(51) Int. Cl.
   *H04W 84/12* (2009.01)
   *H04W 88/04* (2009.01)

(56) References Cited

U.S. PATENT DOCUMENTS

2016/0183205 A1\* 6/2016 Li .................... H04W 8/005
                                                 370/350
2017/0273120 A1   9/2017 Xiang

OTHER PUBLICATIONS

"Device-to-Device Communications with Wi-Fi Direct: Overview and Experimentation," by Daniel Camps-Mur, Andres Garcia Saavedra, and Pablo Serrano, IEEE Wireless Communications, pp. 96-104, Jun. 2013.\*
TIPO, "Taiwanese Office Action and Search Report for TW Application No. 106146612", Taiwan, dated Aug. 6, 2018.
European Patent Office, EESR, dated May 24, 2019, Germany.

\* cited by examiner

NETWORK DEVICE AND WPS CONNECTION METHOD THEREOF

CROSS REFERENCE TO RELATED APPLICATION

This application also claims priority to Taiwan Patent Application No. 106146612 filed in the Taiwan Patent Office on Dec. 29, 2017, the entire content of which is incorporated herein by reference.

TECHNICAL FIELD

The present disclosure relates to a network device, in particular to a highly efficient network device. The present disclosure further relates to the WPS connection method of the network device.

BACKGROUND

Wi-Fi is a very popular wireless communication technology for now, which has been comprehensively applied to computers, hand-held mobile devices, and network devices in local network systems. It is necessary to establish the Wi-Fi protection setup connection between two devices before the two devices communicate with each other via Wi-Fi. The major object of the WPS is to simplify the wireless security settings of network devices.

A mesh network may include a lot of network devices, such as access points (AP), repeaters, and computers. When a user wants to establish a WPS connection between a network device and another network device for the two network devices to communicate with each other via Wi-Fi, the user should know the current mode of the network device. In other words, the user should know whether the network device already has an uplink connection or not. If the network device has no the uplink connection, it means the network is in the client mode, hence, it is necessary to establish the uplink connection for the network device. If the network device already has the uplink connection, it means the network is in the AP mode, hence, it is necessary to establish a downlink connection for the network device.

However, the user may need to use some complicated methods so as to find out the current mode of the network device. For this reason, the user may waste a lot of time in order to successfully establish the WPS connection between several network devices, which is very inconvenient and inefficient.

Thus, it has become an important issue to provide a WPS connection technology in order to overcome the problems that the conventional WPS connection technology is inconvenient and inefficient.

SUMMARY

Therefore, it is a primary objective of the present disclosure to provide a network device and the WPS connection method thereof to overcome various problems of the conventional WPS connection technology.

To achieve the foregoing objective, the present disclosure provides a network device, which can be disposed in a mesh network, and include a WPS button and a processing circuit. The WPS button may trigger a WPS connection process. The processing circuit may be connected to the WPS button. The processing circuit can determine whether the uplink connection of the network device exists; if the uplink connection of the network device does not exist, the processing circuit can implement an uplink connection process; if the uplink connection of the network device exists, the processing circuit can implement a downlink connection process.

In a preferred embodiment, the network further includes an indicator circuit coupled to the processing circuit. When the processing circuit determines that the uplink connection does not exist, the indicator circuit generates a first indicator signal. When the processing circuit determines that the uplink connection exists, the indicator circuit generates a second indicator signal.

In a preferred embodiment, when the processing circuit implements the downlink connection process, the processing circuit transmits a beacon including an information element to a target device, and receives a probe request from the target device in order to establish the WPS connection between the network device and the target device.

In a preferred embodiment, when the processing circuit implements the uplink connection process, the processing circuit transmits an extensible authentication protocol message including a private tag length value to the target device in order to establish the WPS connection between the network device and the target device.

To achieve the foregoing objective, the present disclosure further provides a WPS connection method, which includes the following steps: triggering a WPS connection process by the WPS button of a network device; determining whether the uplink connection of the network device exists by the processing circuit of the network device after the WPS connection process is triggered; implementing an uplink connection process by the processing circuit if the uplink connection does not exist; and implementing an downlink connection process by the processing circuit if the uplink connection exists.

In a preferred embodiment, the step of determining whether the uplink connection of the network device exists by the processing circuit of the network device after the WPS connection process is triggered further includes the following steps: generating a first indicator signal by the indicator circuit of the network device when the processing circuit determines that the uplink connection does not exist; and generating a second indicator signal by the indicator circuit when the processing circuit determines that the uplink connection exists.

In a preferred embodiment, the step of implementing the downlink connection process by the processing circuit if the uplink connection exists further includes the following step: transmitting a beacon comprising an information element to a target device, and receiving a probe request from the target device by the processing circuit in order to establish the WPS connection between the network device and the target device.

In a preferred embodiment, the step of implementing the uplink connection process by the processing circuit if the uplink connection does not exist further includes the following step: transmitting an extensible authentication protocol message including a private tag length value to the target device by the processing circuit in order to establish the WPS connection between the network device and the target device.

The network device and the WPS connection method thereof in accordance with the present disclosure may have the following advantages:

(1) In one embodiment of the present disclosure, the network device can automatically determine whether it is in the client mode or the AP mode so as to determine whether to implement the uplink connection process or the downlink connection process. Thus, the user can easily find out the current mode of the network device without using complicated methods, which can save a lot of time for the user, so is more convenient and highly efficient.

(2) In one embodiment of the present disclosure, when the network device is in the AP mode and implement the downlink connection process, the network device can automatically determine whether another network device implementing the uplink connection process is manufactured by the same manufacturer, and transmit the corresponding data thereto, which can significantly increase the communication performance of the mesh network.

(3) In one embodiment of the present disclosure, after the WPS button of the network device is activated, the network device can implement the WPS connection to connect to another network device; in addition, the network device can further exchange backhaul information, service set identifier, and other important information with the aforementioned network device, which can further improve the communication performance of the mesh network.

(4) In one embodiment of the present disclosure, when the network device is in the AP mode and implements the downlink connection process, the network device can simultaneously trigger all network devices, in the same topology, in the AP mode to execute the downlink connection process at the same time, which can further improve the efficiency and the communication performance of the mesh network.

(5) In one embodiment of the present disclosure, the network device can further include an indicator circuit, which can show the current status of the network device and whether the network device has been successfully connected to the target device, which can provide a user-friendly interface.

(6) In one embodiment of the present disclosure, the design of the network device is very simple, so can achieve the desired technical effect without significantly increasing cost. Therefore, the network can achieve high commercial value.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
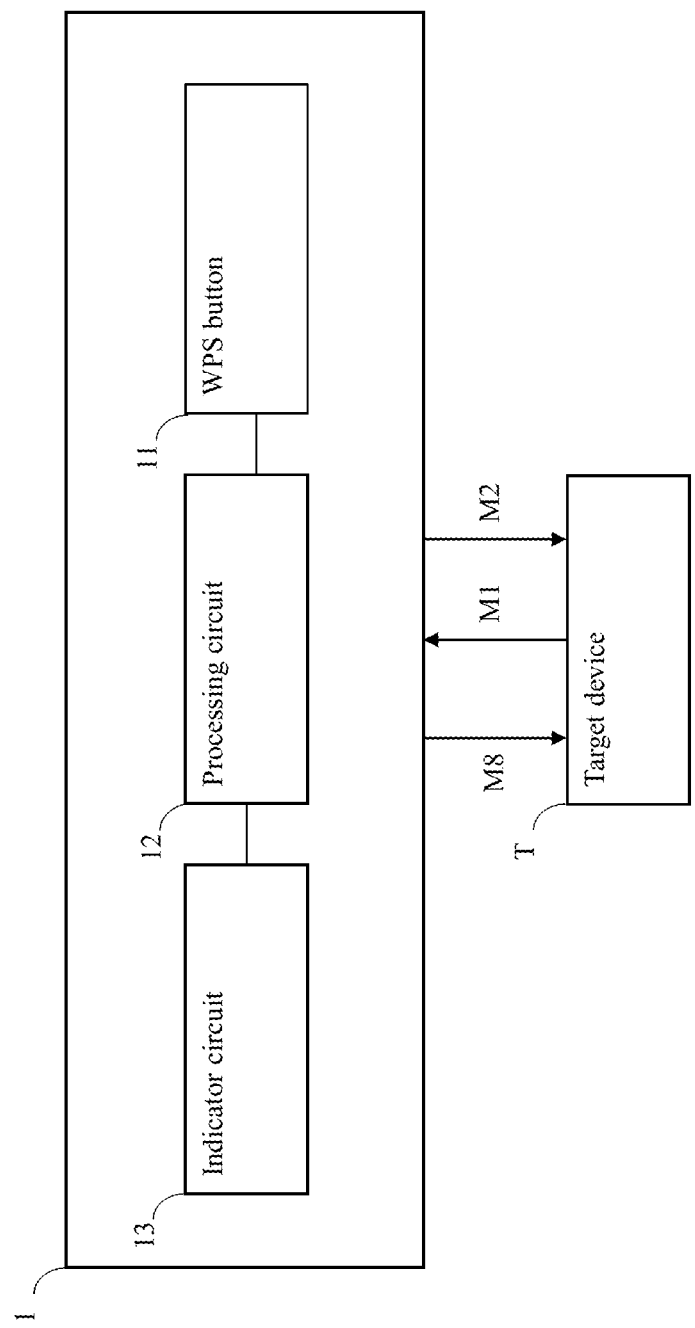
FIG. 1 is a block diagram of a network device of a first embodiment in accordance with the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Please refer to FIG. 1, which is a block diagram of a network device of a first embodiment in accordance with the present disclosure. As shown in FIG. 1, the network device 1 is disposed in a mesh network, and the mesh network further includes other different network devices, such as access points (AP), repeaters, routers, and computers. The network device 1 includes a WPS button 11, a processing circuit 12, and an indicator circuit 13.

The WPS button 11 can be pressed to trigger a WPS connection process.

The processing circuit 12 is connected to the WPS button 11. The processing circuit 12 can determine whether an uplink connection of the network device 1 exists. If the uplink connection of the network device 1 does not exist, the processing circuit 12 can implement an uplink connection process. On the contrary, if the uplink connection of the network device exists, the processing circuit 12 can implement a downlink connection process. In a preferred embodiment, the processing circuit 12 may be a microcontroller (MCU), a central processing unit, or other similar components.

The indicator circuit 13 is connected to the processing circuit 12. When the processing circuit 12 determines that the uplink connection does not exist, the indicator circuit 13 generates a first indicator signal. Alternatively, when the processing circuit 12 determines that the uplink connection exists, the indicator circuit 13 generates a second indicator signal. In a preferred embodiment, the indicator signal may be an indicator lamp or other similar components.

When the processing circuit 12 implements the downlink connection process, the processing circuit 12 transmits a beacon including an information element (WPS IE) to a target device T, and receives a probe request from the target device T. Then, the processing circuit 12 receives an extensible authentication protocol message M1 (WPS EAP message M1) transmitted from the target device T, and determines whether the extensible authentication protocol message M1 includes a private tag length value (Private TLV). When the extensible authentication protocol message M1 includes the private tag length value, the processing circuit 12 determines that the network device 1 and the target device T are manufactured by the same manufacturer. Meanwhile, the processing circuit 12 transmits an extensible authentication protocol message M2 and the private tag length value to the target device T, and then further transmits an extensible authentication protocol message M8, backhaul information, and a service set identifier (SSID) to the target device T in order to establish the WPS connection between the network device 1 and the target device T. Afterward, the network device 1 can communicate with the target device T via Wi-Fi. More specifically, the backhaul information can establish the communication connection between all devices in the mesh network, so any one of these devices can be modified without being disconnected from the mesh network (e.g. modify the service set identifier of the device). The extensible authentication protocol messages (WPS EAP message, capable of two devices to communicate with each other and achieve authorization) M1, M2, M8, and the service set identifier are already included in the currently available WPS connection technologies, so will not be described therein.

On the contrary, when the extensible authentication protocol message M1 does not include the private tag length value, the processing circuit 12 determines that the network device 1 and the target device T are not manufactured by the same manufacturer, so the processing circuit 12 takes the target device T as a general client device. Meanwhile, the processing circuit 12 transmits the extensible authentication protocol message M2 and the private tag length value to the target device T, and then further transmits the extensible authentication protocol message M8 and the service set identifier (SSID) to the target device in order to establish the WPS connection between the network device 1 and the target device T. Afterward, the network device 1 can communicate with the target device T via Wi-Fi.

After the WPS connection between the network device 1 and the target device T has been successfully established, and the two devices can communicate with each other via Wi-Fi, the indicator circuit 13 generates a third indicator signal. On the contrary, if the WPS connection between the network device 1 and the target device T cannot be successfully established, the indicator circuit 13 generates a fourth indicator signal. The aforementioned first indicator signal, second indicator signal, third indicator signal, and fourth indicator signal may be the light signals with different colors, which can show the current status of the network device 1, and whether the WPS connection between the network device 1 and the target device T is established by different colors.

When implementing the uplink connection, the processing circuit 12 transmits the extensible authentication protocol message M1 including the private tag length value to the target device T in order to establish the WPS connection between the network device 1 and the target device T.

After the WPS connection is established, the processing circuit 12 updates the topology saved in the processing circuit 12, and synchronously updates the topologies of all of the other devices in the mesh network, which can significantly improve the communication performance of the mesh network.

As described above, in an exemplary embodiment, the network device 1 can automatically determine whether it is in the client mode or the AP mode, in order to determine whether to implement the uplink connection process or the downlink connection process. Accordingly, the user can easily find out the current mode of the network device 1 without using complicated methods, which can save a lot of time for the user, so it is more convenient and highly efficient.

In addition, the network device 1 can show the current status thereof and whether it is successfully connected to the target device T via different indicator signals, so the user can easily find out the current status of the network device 1 and whether it is successfully connected to the target device 1, which can provide a user-friendly interface for the user.

It is worthy to point out that the user may need to use some complicated methods so as to find out the current mode of the network device when using the previously available WPS connection technologies. For the reason, the user may waste a lot of time in order to successfully establish the WPS connection between several network devices, which is very inconvenient and inefficient. On the contrary, according to one exemplary embodiment of the present disclosure, the network device can automatically determine whether it is in the client mode or the AP mode so as to determine whether to implement the uplink connection process or the downlink connection process. Thus, the user can easily find out the current mode of the network device without using complicated methods, which can save a lot of time for the user, so it is more convenient and highly efficient.

Also, according to one embodiment of the present disclosure, when the network device is in the AP mode and implement the downlink connection process, the network device can automatically determine whether another network device implementing the uplink connection process is manufactured by the same manufacturer, and transmit the corresponding data thereto, which can significantly increase the communication performance of the mesh network.

Besides, according to one embodiment of the present disclosure, after the WPS button of the network device is activated, the network device can implement the WPS connection to connect to another network device; in addition, the network device can further exchange backhaul information, service set identifier, and other important information with the aforementioned network device, which can further improve the communication performance of the mesh network.

Further, according to one embodiment of the present disclosure, when the network device is in the AP mode and implements the downlink connection process, the network device can simultaneously trigger all network devices, in the same topology, in the AP mode to execute the downlink connection process at the same time, which can further improve the efficiency and the communication performance of the mesh network.

Moreover, according to one embodiment of the present disclosure, the network device can further include an indicator circuit, which can show the current status of the network device and whether the network device has been successfully connected to the target device, which can provide a user-friendly interface.

Furthermore, according to one exemplary embodiment of the present disclosure, the design of the network device is very simple, so can achieve the desired technical effect without significantly increasing cost. Therefore, the network can achieve high commercial value.

Figure 2:
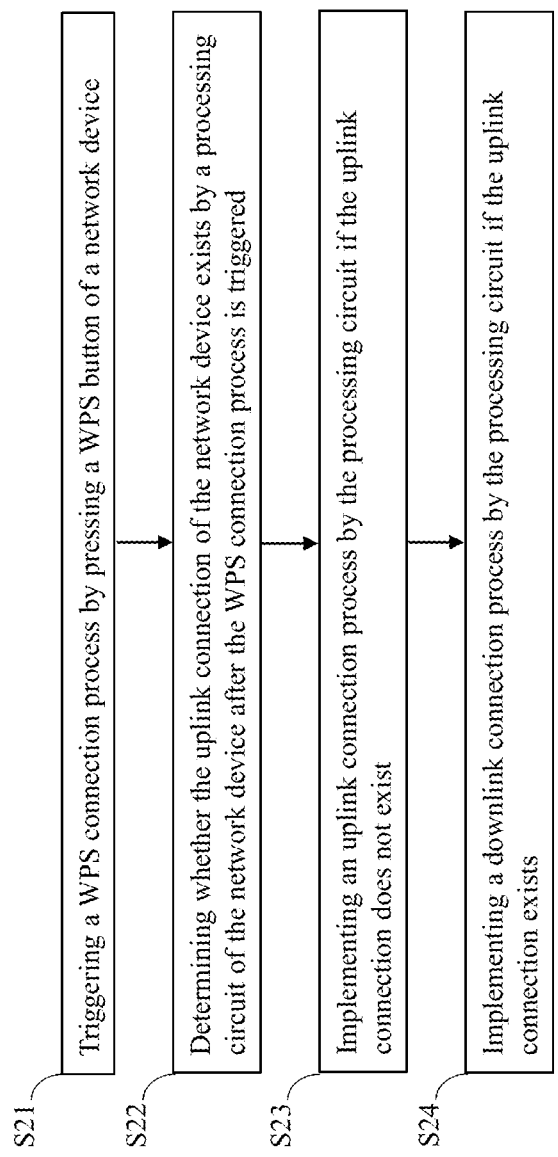
FIG. 2 is a flow chart of the first embodiment in accordance with the present disclosure.

Please refer to FIG. 2, which is a flow chart of the first embodiment in accordance with the present disclosure. As shown in FIG. 2, the WPS connection method of the network device 1 of the embodiment includes the following steps:

Step S21: triggering a WPS connection process by pressing a WPS button of a network device.

Step S22: determining whether the uplink connection of the network device exists by a processing circuit of the network device after the WPS connection process is triggered.

Step S23: implementing an uplink connection process by the processing circuit if the uplink connection does not exist.

Step S24: implementing a downlink connection process by the processing circuit if the uplink connection exists.

The exemplary embodiment just exemplifies the present disclosure and is not intended to limit the scope of the present disclosure; any equivalent modification and variation according to the spirit of the present disclosure would be also fell within the scope of the following claims and their equivalents.

Figure 3:
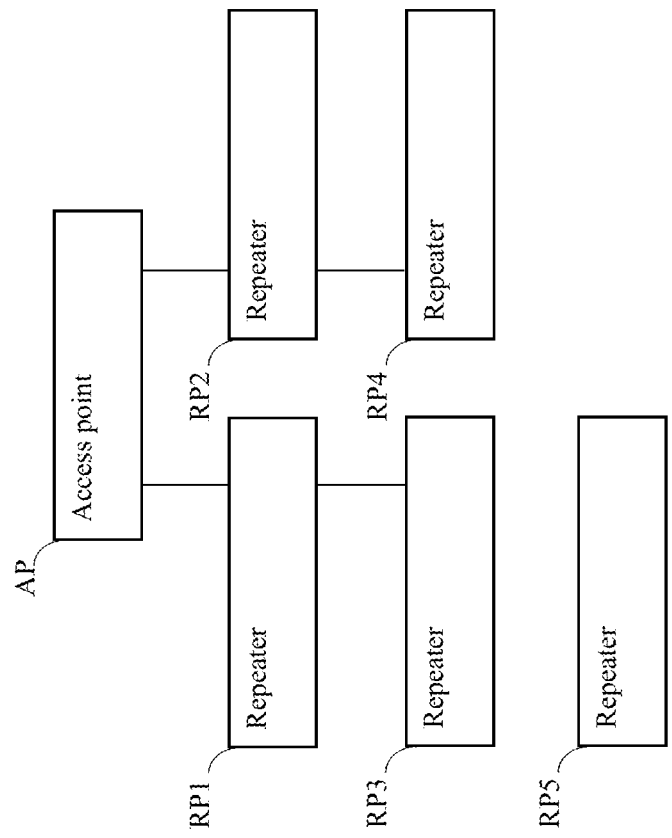
FIG. 3 is a schematic diagram of a mesh network composed of several network devices of a second embodiment in accordance with the present disclosure.

Please refer to FIG. 3, which is a schematic diagram of a mesh network composed of several network devices of a second embodiment in accordance with the present disclosure. As shown in FIG. 3, the mesh network M includes an access point AP and repeaters RP1~RP5, wherein the Wi-Fi connection between the access point AP and the repeaters RP1~RP4 has been established, but the Wi-Fi connection between the repeater RP5 and the access point AP isn't to be established yet.

After a user presses the WPS button of the repeater RP5, the repeater RP5 determines whether the uplink connection thereof exists. As the repeater RP5 has yet to establish the Wi-Fi connection with the access point AP and the repeaters RP1~RP4, the repeater RP5 determines that the uplink connection thereof does not exist. Meanwhile, the indicator lamp of the repeater RP5 generate red light, which means the repeater RP5 is in the client mode for now, and can implement the uplink connection process.

Then, the repeater RP5 transmits an extensible authentication protocol message M1 including a private tag length value to the repeater RP3 (i.e. target device) in order to establish the WPS connection between the repeater RP5 and the repeater RP3.

Finally, the repeater RP5 determines whether the Wi-Fi connection between repeater RP5 and the repeater RP3 is successfully established. If the Wi-Fi connection is successfully established, the indicator lamp of the repeater RP5 generates blue light to notify the user that the repeater RP5 can communicate with the repeater RP3 via Wi-Fi, and the repeater RP5 can update the topology saved therein, and synchronously update the topologies of all of the other devices in the mesh network M. If the Wi-Fi connection fails to be successfully established, the indicator lamp of the repeater RP5 blinks to notify the user that the repeater RP5 cannot communicate with the repeater RP3 via Wi-Fi.

After the user presses the WPS button of the repeater RP3, the repeater RP3 determines whether the uplink connection thereof exists. As the repeater RP3 has established the Wi-Fi connection with the repeater RP1, the repeater RP3 determines that the uplink connection thereof exists. Meanwhile, the indicator lamp of the repeater RP3 generate green light, which means the repeater RP3 is in the AP mode for now, and can implement the downlink connection process.

Next, the repeater RP3 transmits a beacon including an information element to the repeater RP5 (i.e. target device) and the other network devices in the mesh network M, the access point AP, and the repeaters RP1, RP2, and RP4, such that the access point AP, and the repeaters RP1, RP2, and RP4 can also receive the probe request from the repeater RP5 at the same time.

Then, the repeater RP3 (or the other network devices receiving the probe request from the repeater RP5) receives an extensible authentication protocol message M1 transmitted from the repeater RP5, and determines whether the extensible authentication protocol message M1 includes a private tag length value. When the extensible authentication protocol message M1 includes the private tag length value, the repeater RP3 determines that the repeater RP3 and the repeater RP5 are manufactured by the same manufacturer.

Afterward, the repeater RP3 transmits an extensible authentication protocol message M2 and the private tag length value to the repeater RP5, and further transmits an extensible authentication protocol message M8, backhaul information, and a service set identifier to the repeater RP5 in order to establish the WPS connection between the repeater RP3 and the repeater RP5.

Finally, the repeater RP3 determines whether the WPS connection between the repeater RP3 and the repeater RP5 is successfully established. If the Wi-Fi connection is successfully established, the indicator lamp of the repeater RP3 generates blue light to notify the user that the repeater RP3 can communicate with the repeater RP5 via Wi-Fi, and the repeater RP3 can update the topology saved therein, and synchronously update the topologies of all of the other devices in the mesh network M. If the Wi-Fi connection fails to be successfully established, the indicator lamp of the repeater RP3 blinks to notify the user that the repeater RP3 cannot communicate with the repeater RP5 via Wi-Fi.

When the extensible authentication protocol message M1 does not include the private tag length value, the repeater RP3 determines that the repeater RP3 and the repeater RP5 are not manufactured by the same manufacturer, so the repeater RP3 takes the repeater RP5 as a general client device. In the meanwhile, the repeater RP3 transmits the extensible authentication protocol message M2 and the private tag length value to the repeater RP5, and further transmits an extensible authentication protocol message M8 and the service set identifier to the repeater RP5 in order to establish the WPS connection between the repeater RP3 and the repeater RP5.

Similarly, the repeater RP3 determines whether the WPS connection between the repeater RP3 and the repeater RP5 is successfully established. If the Wi-Fi connection is successfully established, the indicator lamp of the repeater RP3 generates blue light to notify the user that the repeater RP3 can communicate with the repeater RP5 via Wi-Fi, and the repeater RP3 can update the topology saved therein, and synchronously update the topologies of all of the other devices in the mesh network M. If the Wi-Fi connection fails to be successfully established, the indicator lamp of the repeater RP3 blinks to notify the user that the repeater RP3 cannot communicate with the repeater RP5 via Wi-Fi.

Please refer to FIG. 4, FIG. 5, FIG. 6A, and FIG. 7A, which are first~fourth flow charts of the second embodiment in accordance with the present disclosure. FIG. 4, FIG. 5, FIG. 6A, and FIG. 7A illustrate the detail steps of the WPS connection method of the second embodiment in accordance with the present disclosure, as follows:

Step S41: a user presses the WPS button of a repeater; then, the process proceeds to Step S42.

Step S42: the repeater determines whether the uplink connection thereof exists. If it does, the process proceeds to Step S51; if it does not, the process proceeds to Step S43.

Step S43: the indicator lamp of the repeater generates red light; then, the process proceeds to Step S44.

Step S44: the repeater transmits an extensible authentication protocol message M1 including a private tag length value to a target device; then, the process proceeds to Step S45.

Step S45: the WPS connection between the repeater and the target device is established; then, the process proceeds to Step S46.

Step S46: the repeater determines whether the Wi-Fi connection between the repeater and the target device has been successfully established. If it does, the process proceeds to Step S47; if it does not, the process proceeds to Step S461.

Step S461: the indicator lamp of the repeater blinks.

Step S47: the indicator lamp of the repeater generates blue light; then, the process proceeds to Step S48.

Step S48: the repeater updates the topology saved therein, and synchronously updates the topologies of all of the other devices in the mesh network.

Step S51: the indicator lamp of the repeater generates green light; then, the process proceeds to Step S52.

Step S52: the repeater transmits a beacon including an information element and a notification message to the target device and the other network devices in the mesh network; then, the process proceeds to Step S53.

Step S53: the repeater (or another network device receiving a probe request from the target device) determines whether the extensible authentication protocol message M1 includes the private tag length value. If it does, the process proceeds to Step S54; if it does not, the process proceeds to Step S531.

Step S531: the repeater transmits an extensible authentication protocol message M2 and the private tag length value to the target device, and further transmits an extensible authentication protocol message M8 and a service set identifier to the target in order to establish the WPS connection between the repeater and the target device; then, the process proceeds to Step S532.

Step S532: the repeater takes the target device as a general client device, and communicates with the target device via Wi-Fi.

Step S54: the repeater transmits the extensible authentication protocol message M2 and the private tag length value to the target device, and further transmits the extensible authentication protocol message M8, backhaul information, and the service set identifier to the target device so as to establish the WPS connection between the repeater and the target device; then, the process proceeds to Step S55.

Step S55: the repeater determines whether the Wi-Fi connection between the repeater and the target device has been successfully established. If it does, the process proceeds to Step S56; if it does not, the process proceeds to Step S551.

Step S551: the indicator lamp of the repeater blinks.

Step S56: the indicator lamp of the repeater generates blue light; then, the process proceeds to Step S57.

Step S57: the repeater updates the topology saved therein, and synchronously updates the topologies of all of the other network devices in the mesh network.

The embodiment just exemplifies the present disclosure and is not intended to limit the scope of the present disclosure; any equivalent modification and variation according to the spirit of the present disclosure is to be also included within the scope of the following claims and their equivalents.

Figure 4:
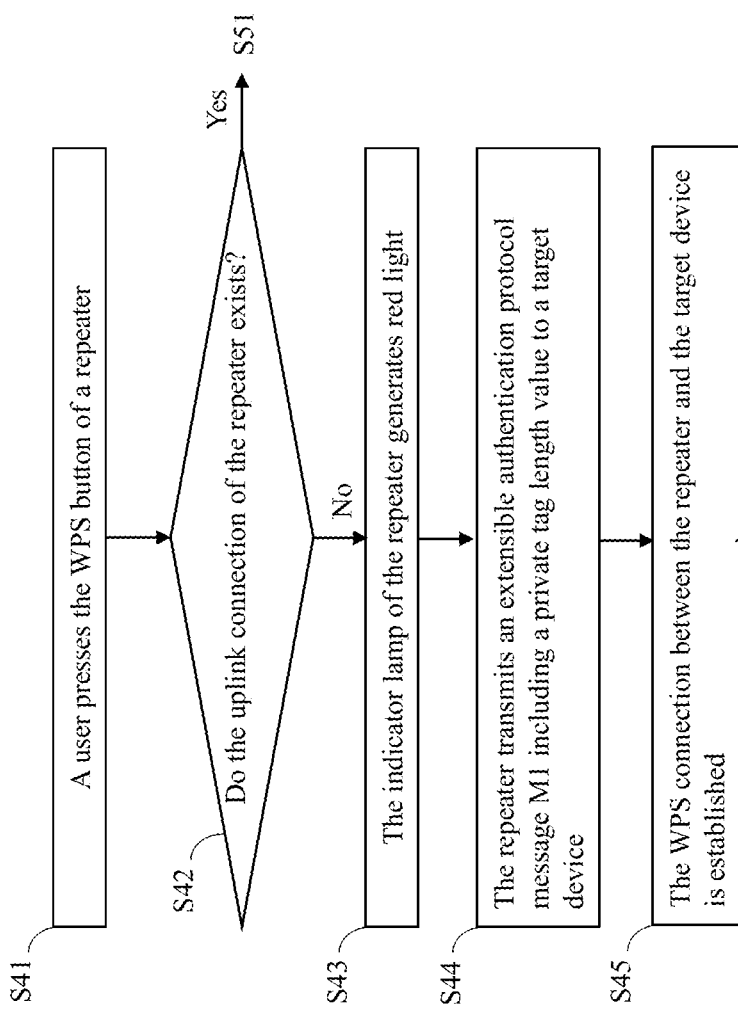
FIG. 4 is a first schematic diagram of the second embodiment in accordance with the present disclosure.
Figure 5:
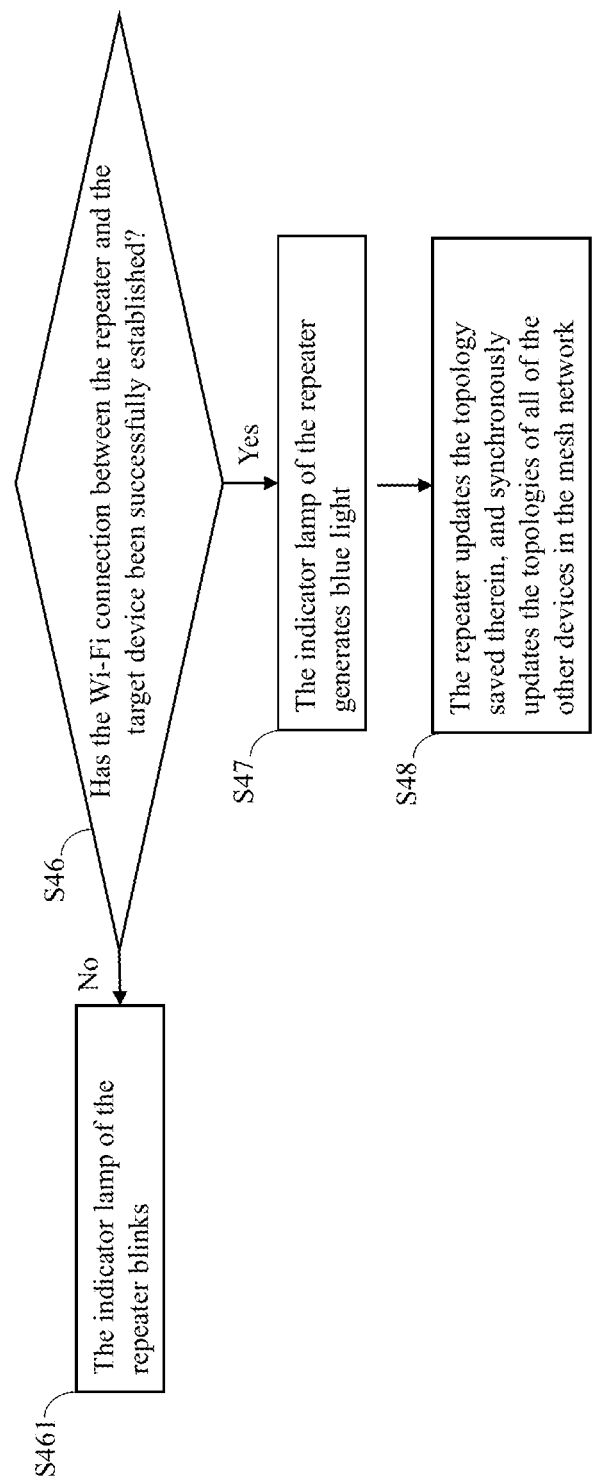
FIG. 5 is a second schematic diagram of the second embodiment in accordance with the present disclosure.
Figure 6A:
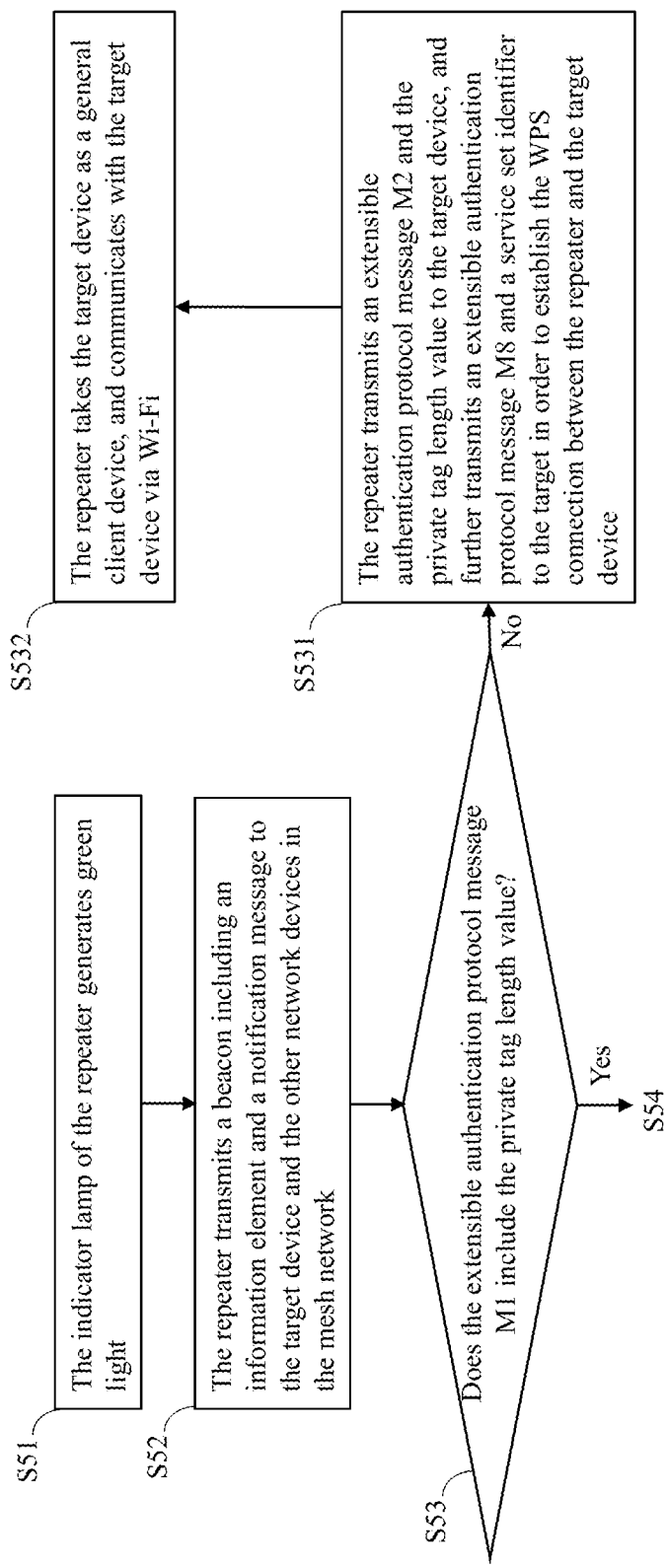
FIG. 6A is a third schematic diagram of the second embodiment in accordance with the present disclosure.
Figure 6B:
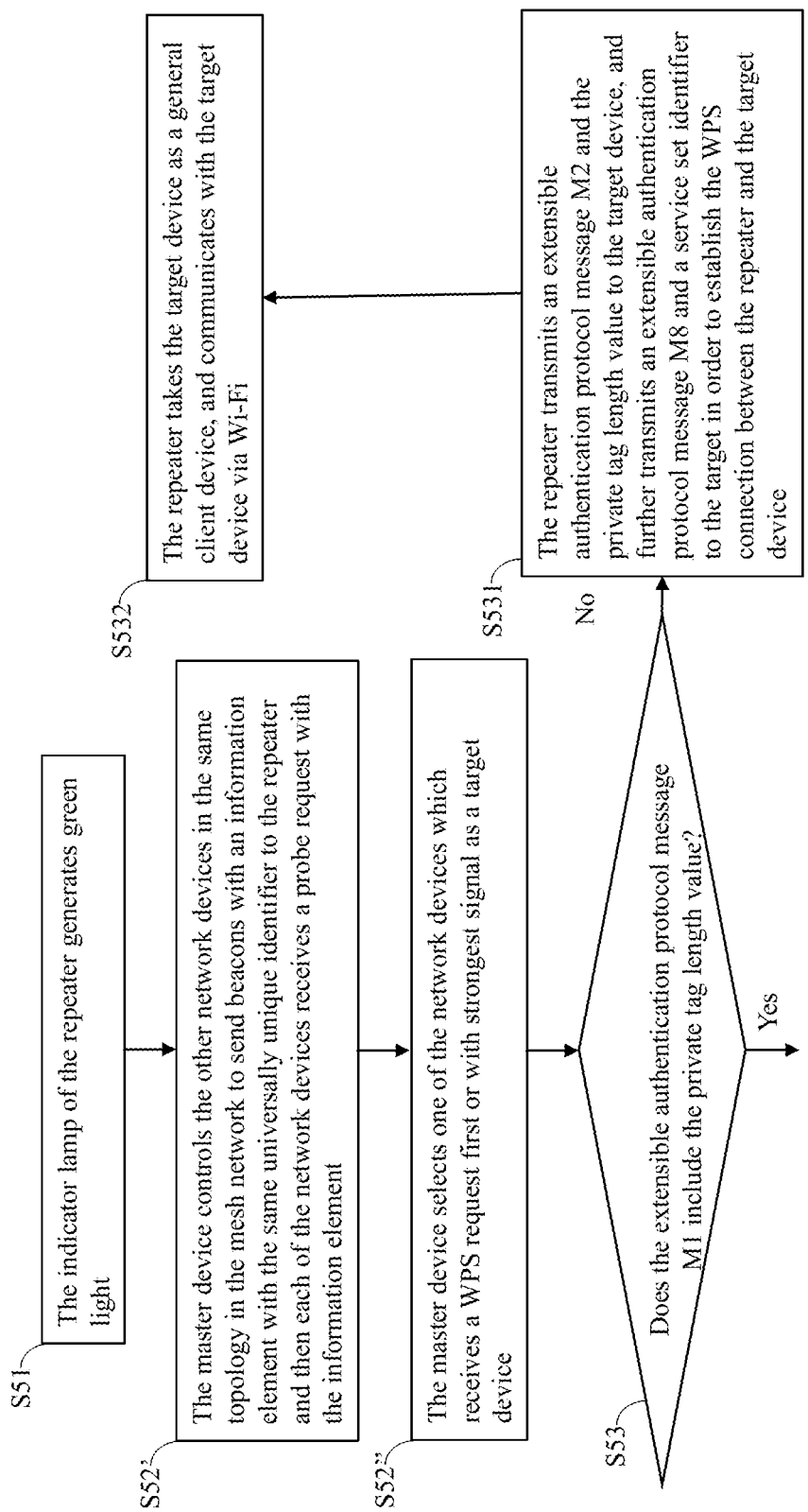
FIG. 6B is a first schematic diagram of the third embodiment in accordance with the present disclosure.
Figure 7A:
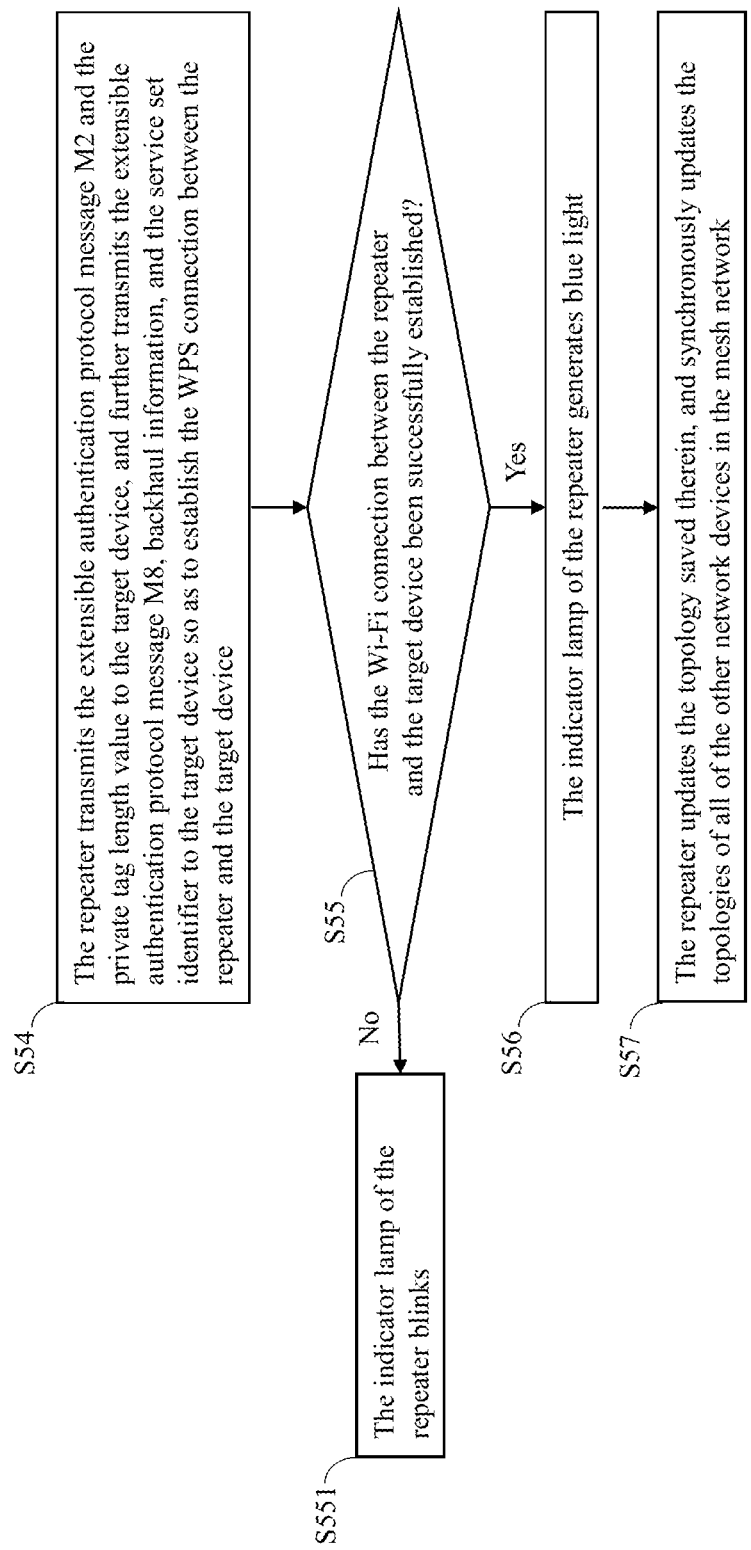
FIG. 7A is a fourth schematic diagram of the second embodiment in accordance with the present disclosure.
Figure 7B:
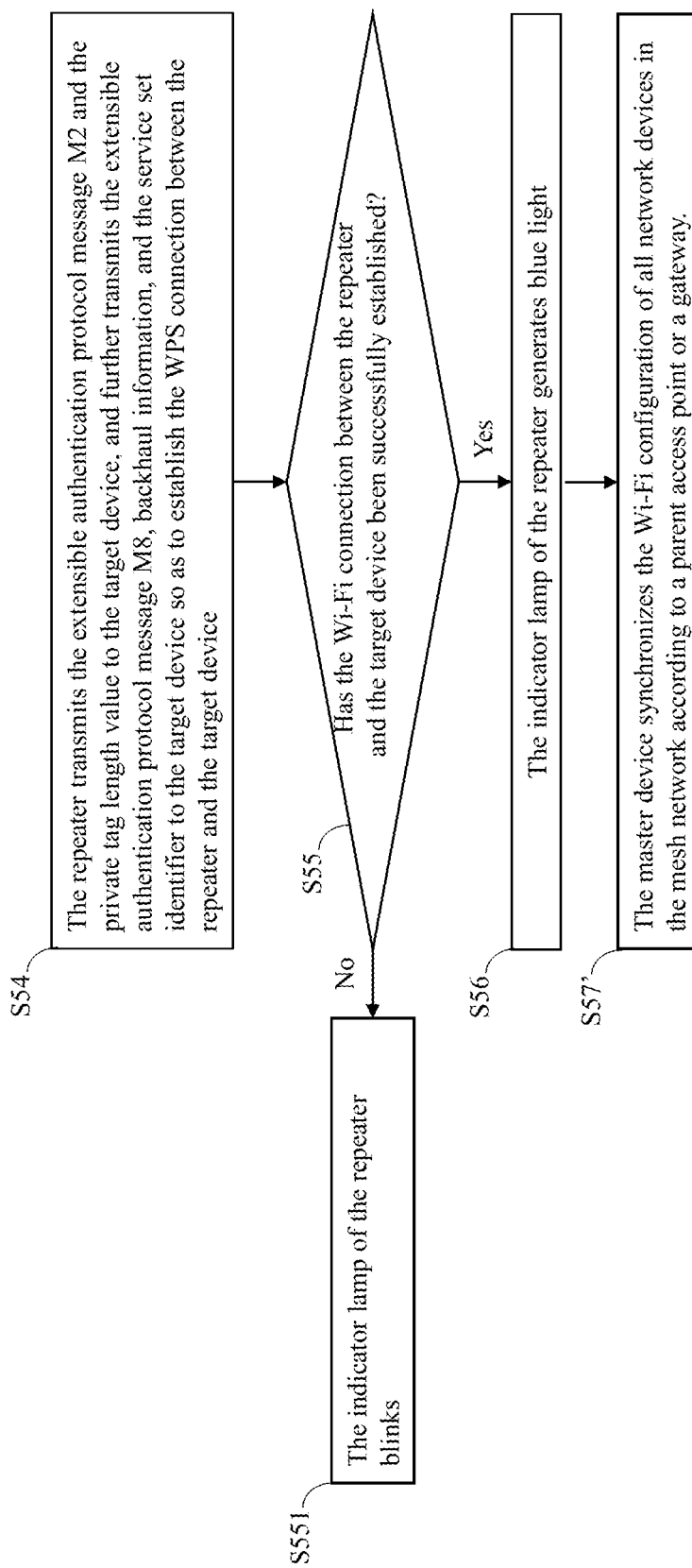
FIG. 7B is a second schematic diagram of the third embodiment in accordance with the present disclosure.

Please refer to FIG. 6B, and FIG. 7B, which are first-second flow charts of the third exemplary embodiment in accordance with the present disclosure and please also refer to. FIG. 4 and FIG. 5, which illustrate the detail steps of the WPS connection method of the third exemplary embodiment in accordance with the present disclosure, as follows:

Step S41~Step S48 are similar to the previous embodiment, so will not be described again herein; the difference between the embodiment and the previous embodiment is that the process proceeds to Step S52' and Step S52" after Step S51.

Step S52': the master device (or the controller) controls the other network devices (candidate network devices) in the same topology in the mesh network to send beacons with an information element (WPS IE) with the same universally unique identifier (UUID) to the repeater and then each of the network devices receives a probe request with the information element; then, the process proceeds to Step S52".

Step S52": the master device (or the controller) selects one of the network devices which receives a WPS request first or with strongest signal as a target device; then, the process proceeds to Step S53.

Step S53~Step S56 are similar to the previous embodiment, so will not be described again herein; the difference between the embodiment and the previous embodiment is that the process proceeds to Step S57' after Step S56.

Step S57: the master device (or the controller) synchronizes the Wi-Fi configuration (e.g. SSID, credential, etc.) of all network devices in the mesh network according to a parent access point or a gateway.

The above process can make sure that the WPS connection never fails if there are multiple repeaters in the same topology.

To sum up, according to one embodiment of the present disclosure, the network device can automatically determine whether it is in the client mode or the AP mode so as to determine whether to implement the uplink connection process or the downlink connection process. Thus, the user can easily find out the current mode of the network device without using complicated methods, which can save a lot of time for the user, so is more convenient and highly efficient.

According to one embodiment of the present disclosure, when the network device is in the AP mode and implement the downlink connection process, the network device can automatically determine whether another network device implementing the uplink connection process is manufactured by the same manufacturer, and transmit the corresponding data thereto, which can significantly increase the communication performance of the mesh network.

Also, according to one embodiment of the present disclosure, after the WPS button of the network device is activated, the network device can implement the WPS connection to connect to another network device; in addition, the network device can further exchange backhaul information, service set identifier, and other important information with the aforementioned network device, which can further improve the communication performance of the mesh network.

Further, according to one embodiment of the present disclosure, when the network device is in the AP mode and implements the downlink connection process, the network device can simultaneously trigger all network devices, in the same topology, in the AP mode to execute the downlink connection process at the same time, which can further improve the efficiency and the communication performance of the mesh network.

Moreover, according to one embodiment of the present disclosure, the network device can further include an indicator circuit, which can show the current status of the network device and whether the network device has been successfully connected to the target device, which can provide a user-friendly interface.

Furthermore, according to one embodiment of the present disclosure, the design of the network device is very simple, so can achieve the desired technical effect without significantly increasing cost. Therefore, the network can achieve high commercial value.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A network device, disposed in a mesh network, and, comprising:
   a WPS button, configured to trigger a WPS connection process; and
   a processing circuit, coupled to the WPS button;
   wherein the processing circuit determines whether an uplink connection of the network device exists; if the uplink connection does not exist, the processing circuit implements an uplink connection process; and if the uplink connection exists, the processing circuit implements a downlink connection process, wherein when the processing circuit implements the downlink connection process, the processing circuit transmits a beacon comprising an information element to a target device, and receives a probe request from the target device in order to establish a WPS connection between the network device and the target device, wherein the processing circuit receives an extensible authentication protocol message transmitted from the target device, and determine whether the extensible authentication protocol message comprises a private tag length value, wherein when the processing circuit determines that the extensible authentication protocol message does not comprise the private tag length value, the processing circuit transmits a service set identifier to the target device.

2. The network device of claim 1, further comprising an indicator circuit coupled to the processing circuit, wherein when the processing circuit determines that the uplink connection does not exist, the indicator circuit generates a first indicator signal; when the processing circuit determines that the uplink connection exists, the indicator circuit generates a second indicator signal.

3. The network device of claim 1, wherein the processing circuit determines that the extensible authentication protocol message comprises the private tag length value, the processing circuit transmits a backhaul information and a service set identifier to the target device.

4. The network device of claim 1, wherein after the WPS connection is established, the processing circuit updates a topology saved therein, and synchronously updates topologies of all of the other devices in the mesh network.

5. The network device of claim 1, wherein when the processing circuit implements the downlink connection process, the processing circuit transmits a beacon comprising an information element and a notification message to a target device and the other network devices in the mesh network; when any one of the other network devices receives a probe request from the target device, a WPS connection is established between the target device and the network device which receives the probe request and the target device.

6. The network device of claim 1, wherein when the processing circuit implements the uplink connection process, the processing circuit transmits an extensible authentication protocol message comprising a private tag length value to the target device in order to establish a WPS connection between the network device and the target device.

* * * * *